(12) United States Patent
Avery et al.

(10) Patent No.: US 10,837,525 B2
(45) Date of Patent: Nov. 17, 2020

(54) MOTOR VEHICLE TRANSMISSION

(71) Applicant: Dr. Ing. h.c. F. Porsche Aktiengesellschaft, Stuttgart (DE)

(72) Inventors: Gary Avery, Ludwigsburg (DE); Daniel Knoblauch, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 40 days.

(21) Appl. No.: 16/426,582

(22) Filed: May 30, 2019

(65) Prior Publication Data
US 2019/0376581 A1 Dec. 12, 2019

(30) Foreign Application Priority Data

Jun. 12, 2018 (DE) .......................... 10 2018 113 958

(51) Int. Cl.
*F16H 3/44* (2006.01)
*F16H 3/54* (2006.01)

(52) U.S. Cl.
CPC ............ *F16H 3/54* (2013.01); *B60Y 2200/91* (2013.01); *F16H 2200/2005* (2013.01); *F16H 2200/2035* (2013.01)

(58) Field of Classification Search
CPC ............ F16H 3/44; F16H 2057/02008; F16H 2057/02086; F16H 2057/087; F16H 57/021; F16H 57/10; F16H 2200/2005; F16H 2200/2035
See application file for complete search history.

(56) References Cited

U.S. PATENT DOCUMENTS

| 5,860,885 A * | 1/1999 | Mizuta ................ F16H 63/3026 475/116 |
| 9,855,830 B2 | 1/2018 | Knoblauch |
| 2006/0160653 A1* | 7/2006 | Radinger .............. F16H 57/082 475/314 |
| 2010/0099533 A1* | 4/2010 | Horsfall .................... F16H 3/54 475/146 |
| 2011/0027105 A1* | 2/2011 | Haupt ................. F16H 61/0025 417/53 |

(Continued)

FOREIGN PATENT DOCUMENTS

| DE | 102014117227 A1 | 5/2016 |
| DE | 102015104203 A1 | 9/2016 |

(Continued)

*Primary Examiner* — Edwin A Young
(74) *Attorney, Agent, or Firm* — RatnerPrestia

(57) ABSTRACT

A motor vehicle transmission for coupling an electric machine to a drivetrain of an electrically driveable motor vehicle. The motor vehicle transmission includes a planetary transmission for converting a torque that is introducible by the electric machine. An internal gear of the planetary transmission has an input toothed gear for forming a spur gear stage with a drive shaft of the electric machine. A brake immobilizes a sun gear of the planetary transmission with a static housing. A clutch rotationally conjointly connects the sun gear to the internal gear. The brake and the clutch at least partially overlap as viewed in a radial or axial direction. By virtue of the overlap, it is possible for axial and radial structural space, respectively, to be saved, such that a motor vehicle transmission with a small structural space requirement is made possible.

10 Claims, 7 Drawing Sheets

(56) References Cited

U.S. PATENT DOCUMENTS

| | | | | |
|---|---|---|---|---|
| 2012/0220408 A1* | 8/2012 | Janson | ............... | F16H 63/3023 |
| | | | | 475/144 |
| 2013/0190124 A1* | 7/2013 | Gassmann | ............... | B60K 1/00 |
| | | | | 475/150 |
| 2014/0256493 A1* | 9/2014 | Knoblauch | .......... | B60K 7/0007 |
| | | | | 475/151 |
| 2015/0151634 A1* | 6/2015 | Smetana | ................. | F16H 48/11 |
| | | | | 475/150 |
| 2017/0074378 A1 | 3/2017 | Kirchner | | |
| 2018/0274644 A1* | 9/2018 | Sugiura | ..................... | F16H 9/18 |
| 2019/0017573 A1 | 1/2019 | Schilder et al. | | |

FOREIGN PATENT DOCUMENTS

| | | |
|---|---|---|
| DE | 102015217521 A1 | 3/2017 |
| DE | 102015218820 A1 | 3/2017 |
| DE | 102015016939 A1 | 6/2017 |
| EP | 0346539 A1 | 12/1989 |
| WO | 2017217066 A1 | 12/2017 |

* cited by examiner

MOTOR VEHICLE TRANSMISSION

CROSS-REFERENCE TO RELATED APPLICATION

This application claims priority to German Patent application No. DE 10 2018 113 958.6, filed Jun. 12, 2018, which is incorporated by reference herein in its entirety.

FIELD OF THE INVENTION

The invention relates to a motor vehicle transmission by means of which an electric machine can be coupled to a drivetrain of an electrically driveable motor vehicle.

BACKGROUND OF THE INVENTION

DE 10 2014 117 227 A1 and DE 102015 104 203 A1, which are incorporated by reference herein, have each disclosed a motor vehicle transmission for converting a torque generated by an electric machine, in the case of which motor vehicle transmission a drive shaft of the electric machine is coupled via a spur gear set to an internal gear of a planetary transmission, wherein, for the engagement of different transmission ratio stages, a sun gear of the planetary transmission can be immobilized on a static housing by means of a brake, and the sun gear can be connected to the internal gear by means of a switchable clutch. The converted torque can be conducted out via a planet carrier of the planetary transmission.

There is a constant demand for reducing the structural space requirement of motor vehicle transmissions.

SUMMARY OF THE INVENTION

The device described herein makes it possible to realize a motor vehicle transmission with a small structural space requirement.

Preferred configurations of the invention are specified in the dependent claims and in the following description, which configurations may in each case individually or in combination represent an aspect of the invention.

One aspect of the invention relates to a motor vehicle transmission for coupling an electric machine to a drivetrain of an electrically driveable motor vehicle, having a planetary transmission for converting a torque that is introducible by the electric machine, wherein an internal gear of the planetary transmission has an input toothed gear for forming a spur gear stage with a drive shaft of the electric machine, a brake for immobilizing a sun gear of the planetary transmission with a reference component, in particular a static housing, and a clutch for rotationally conjointly connecting the sun gear to the internal gear, wherein the brake and the clutch at least partially overlap as viewed in a radial direction.

The brake and the clutch can be arranged in nested fashion one inside the other, such that axial structural space for the motor vehicle transmission can be saved. An actuator arrangement provided in each case for the operation of the brake and the operation of the clutch may likewise be arranged in nested fashion one inside the other and overlap as viewed in a radial direction. In particular, it is possible that, at one axial side of the motor vehicle transmission, the power originating from the electric machine can be introduced and, at the same axial side, radially offset with respect to the spur gear stage, the converted power can be conducted out in particular via an output shaft connected to a planet carrier of the planetary transmission. This makes it possible for the brake and the clutch and the associated actuator arrangement to be concentrated at the other axial side of the motor vehicle transmission and to be nested one inside the other in compact fashion, with a small structural space requirement. By virtue of the brake and the clutch being arranged so as to overlap one another in a radial direction, it is possible for axial structural space to be saved, such that a motor vehicle transmission with a small structural space requirement is made possible.

In the non-operated state, that is to say when no operation force is introduced into the clutch by an operation system, the clutch may be in the opened position, in which a torque flow is interrupted. In this case, the clutch is designed as a so-called "normally open" clutch. In the event of a component failure, inadvertent propulsion of the motor vehicle can be avoided. Alternatively, in the non-operated state, the clutch may be in the closed position, in which a torque flow is effected. In this case, the clutch is designed as a so-called "normally closed" clutch. The component loads on the clutch and on the operation system can thus be kept low during the ongoing operation of the motor vehicle. In the opened state of the clutch, the sun gear of the planetary transmission can co-rotate substantially without load, without supporting a torque. If the sun gear is immobilized by the brake in the closed state of the brake, the rotational speed of the sun gear is no longer set automatically, but is influenced by the brake. Owing to the coupling, attained by means of the brake, of the sun gear to the reference component, the rotational speed of the reference component can be forcibly imparted to the sun gear. If the reference component is formed by the static housing of the motor vehicle transmission, the sun gear is immovably arrested with the rotational speed zero. If the reference component is formed by a rotating component, the rotational speed of the rotating component is imparted to the sun gear. The rotating component may in particular be coupled by means of a defined transmission ratio, in particular a spur gear pairing, to a shaft of the motor vehicle transmission, in particular to the drive shaft of the electric machine. As a result of the support of the sun gear on the rotating or non-rotating reference component and the resulting predefined rotational speed of the sun gear, the transmission ratio of the planetary transmission can be easily varied with the aid of the brake. The closed state of the brake and the opened state of the brake may thus realize different gear ratio stages for the motor vehicle transmission.

In particular, the brake is arranged radially outside the clutch. If the brake and the clutch are arranged within the static housing, the brake may thus easily be provided at an inner side of the housing. The effort involved in construction, and the structural space required, for immobilizing the sun gear on the housing by means of the brake can thus be kept low/small.

Preferably, planet gears of the planetary transmission which mesh with the internal gear and with the sun gear are at least partially overlapped by the brake and by the clutch as viewed in a radial direction, wherein, in particular, the planet gears are arranged radially on the inside with respect to the brake and to the clutch. In this way, a major part of the planetary transmission can be arranged in nested fashion with the brake and the clutch, whereby the axial structural space requirement can be reduced. The input toothed gear for the spur gear stage with the drive shaft of the electric machine can be positioned axially offset with respect to the planet gears. The radial structural space for the axially offset input toothed gear permits additional design freedom for the transmission ratio of the spur gear stage and/or makes it possible for the drive shaft of the electric machine and the electric machine to be positioned closer to the axis of rotation of the planetary transmission, whereby radial structural space can be saved.

A further aspect of the invention relates to a motor vehicle transmission for coupling an electric machine to a drivetrain of an electrically driveable motor vehicle, having a planetary transmission for converting a torque that is introducible by the electric machine, wherein an internal gear of the planetary transmission has an input toothed gear for forming a spur gear stage with a drive shaft of the electric machine, a brake for immobilizing a sun gear of the planetary transmission with a reference component, in particular a static housing, and a clutch for rotationally conjointly connecting the sun gear to the internal gear, wherein the brake and the clutch at least partially overlap as viewed in an axial direction.

The brake and the clutch may be arranged one behind the other in an axial direction at a common radius region, such that radial structural space for the motor vehicle transmission can be saved. An actuator arrangement provided in each case for the operation of the brake and the operation of the clutch may be arranged in nested fashion one inside the other and overlap as viewed in a radial direction, whereby axial structural space can be saved or at least does not need to be unduly increased. In particular, it is possible that, at one axial side of the motor vehicle transmission, the power originating from the electric machine can be introduced and, at the same axial side, radially offset with respect to the spur gear stage, the converted power can be conducted out in particular via an output shaft connected to a planet carrier of the planetary transmission. This makes it possible for the brake and the clutch and the associated actuator arrangement to be concentrated at the other axial side of the motor vehicle transmission and to be arranged in compact fashion, with a small structural space requirement. By virtue of the brake and the clutch being arranged so as to overlap one another in an axial direction, it is possible for radial structural space to be saved, such that a motor vehicle transmission with a small structural space requirement is made possible.

Particularly preferably, planet gears of the planetary transmission which mesh with the internal gear and with the sun gear are at least partially overlapped by the brake or by the clutch as viewed in a radial direction, wherein, in particular, the planet gears are arranged radially on the inside with respect to the brake and to the clutch. In this way, a major part of the planetary transmission can be arranged in nested fashion with the brake or with the clutch, whereby the axial structural space requirement can be reduced. The input toothed gear for the spur gear stage with the drive shaft of the electric machine can be positioned axially offset with respect to the planet gears. The radial structural space for the axially offset input toothed gear permits additional design freedom for the transmission ratio of the spur gear stage and/or makes it possible for the drive shaft of the electric machine and the electric machine to be positioned closer to the axis of rotation of the planetary transmission, whereby radial structural space can be saved.

In particular, the sun gear has a carrier which runs in an axial direction at a substantially constant radius, in particular plate carrier of a multiplate clutch, wherein the brake and the clutch engage on the carrier at different subregions of the carrier which are spaced apart from one another in an axial direction, wherein, in particular, the carrier projects in different axial directions from a substantially radially running connecting web of the sun gear. The brake and the clutch may in particular be designed as a multiplate clutch, in the case of which the plates provided for the friction pairings may be guided displaceably in an axial direction in alternating fashion with an outer plate carrier or with an inner plate carrier. During a closure of the multiplate clutch, the plates can be pressed with frictionally locking action between a pressure plate displaced axially by an operation system between the pressure plate and an axially immovable counterplate. By means of the brake and clutch arranged one behind the other in an axial direction, it is possible for both a plate carrier for the brake and a plate carrier for the clutch to be formed by the carrier connected by means of the connecting web to the sun gear. The number of components and the effort involved in assembly can thus be reduced. Here, it is possible in particular for that part of the carrier which is provided for the brake to project from the connecting web in one axial direction, and for that part of the carrier which is provided for the clutch to project in the opposite axial direction. This permits a compact, structural-space-saving construction. It is furthermore possible for the different axial sides of the connecting web to be used as counterplate in each case for the brake and the clutch, whereby the number of components and/or the axial structural space requirement can be further reduced.

Preferably, planet gears of the planetary transmission which mesh with the internal gear and with the sun gear are at least partially overlapped by the input toothed gear as viewed in a radial direction, wherein, in particular, the planet gears are arranged radially on the inside with respect to the input toothed gear. In this way, a major part of the planetary transmission can be arranged in nested fashion with the spur gear stage, whereby the axial structural space requirement can be reduced. The brake and/or the clutch can be positioned axially offset with respect to the planet gears, such that the brake and the clutch can be positioned at a smaller radius. This permits a compact and structural-space-saving construction for the brake and/or the clutch. Furthermore, for the brake and/or the clutch, radial structural space is created which permits a radial enlargement of the extent of the frictional contact areas. By means of the increasing frictional contact area of the respective instance of frictional contact, the number of instances of frictional contact can be reduced. In this way, it is for example possible for a smaller number of plates to be provided for the brake and/or clutch designed as a multiplate clutch in order to be able to support or transmit a certain predefined torque with frictionally locking action. The axial structural space requirement for the brake and/or for the clutch can thus be reduced.

The brake and/or the clutch is particularly preferably designed as an in particular wet-running multiplate clutch. By means of the multiplicity of friction pairings in the multiplate clutch, a correspondingly high torque can be supported or transmitted. It is furthermore possible for the brake and/or the clutch to be cooled by means of an oil or other coolant, whereby temperature-induced excessive wear of friction linings of the multiplate clutch can be prevented.

In particular, the brake, the clutch and the planetary transmission are arranged within the static housing. It is preferably possible for oil to be conducted into the interior of the housing in order to lubricate the planetary transmission and/or cool the brake and the clutch. By means of the housing, an escape of the oil can be prevented, and can be easily collected in an oil sump.

It is preferable if a clutch operating actuator arrangement, which is designed in particular as a piston-cylinder unit and which serves for operating the clutch, and a brake operating actuator arrangement, which is designed in particular as a piston-cylinder unit and which serves for operating the brake, are arranged offset with respect to one another in an axial direction, wherein, in particular, the clutch operating actuator arrangement and the brake at least partially overlap as viewed in a radial direction. It is thus possible for the in particular radially inner actuator arrangement to be offset further into the interior of the housing of the motor vehicle transmission. In this way, at the axial outer side of the housing of the motor vehicle transmission, a depression may be provided which is defined by the axial offset of the radially inner actuator arrangement relative to the radially outer actuator arrangement, which depression creates additional structural space. This structural space can be utilized by another motor vehicle assembly, such that a large number of motor vehicle assemblies can be accommodated with a small structural space requirement. The structural space provided for the motor vehicle transmission can thus be utilized in a more compact manner. Here, use is made of the realization that the frictional contact surfaces of the clutch and of the brake should be provided radially as far to the outside as possible, and structural space is thus available radially within the frictional contact surfaces, which structural space can be at least partially utilized by the clutch operating actuator arrangement and/or by the brake operating actuator arrangement. In particular, the structural space radially within the clutch can be utilized by the planetary transmission, such that, in the case of an axial offset of the brake relative to the clutch, structural space for the positioning of the clutch operating actuator arrangement or of the brake operating actuator arrangement is available at least radially within the brake. Alternatively, the clutch operating actuator arrangement and the brake operating actuator arrangement may be nested concentrically one inside the other in a common axial region and form a so-called "concentric slave cylinder" ("CSC").

It is particularly preferable if the reference component is connected by means of a shift clutch for the coupling of the reference component to the static housing or, in particular indirectly via an interposed shift stage, to the drive shaft of the electric machine. The reference component may for example be a hollow shaft mounted on a sun gear shaft connected to the sun gear. In particular, the reference component is mounted immovably in an axial direction, preferably on the sun gear shaft, by means of at least one axial bearing. The brake, which is designed in particular as a multiplate clutch, may have an input part, which is connected to the clutch and which is designed in particular as an inner plate carrier, and an output part, which in the closed state of the brake is couplable in frictionally locking fashion to the input part and which is designed in particular as an outer plate carrier. The reference component may in particular be connected rotationally conjointly to and/or formed in one piece with the output part of the brake. The shift clutch which is coupled rotationally conjointly to the reference component may, in a first shift state, couple the reference component to the static housing and, in a second shift state, couple the reference component to a rotating component. The rotating component may for example be a toothed gear which meshes with the drive shaft of the electric machine, such that the reference component can be coupled indirectly via a shift stage to the drive shaft. The shift stage may provide a transmission ratio of less than 1, greater than 1 or equal to 1, such that, in the closed state of the brake, the sun gear can rotate at a rotational speed which is dependent on the rotational speed of the electric machine, and which is in particular non-zero. By means of the coupling of the rotational speed of the sun gear to the rotational speed of the drive shaft, it is preferably possible for the transmission ratio of the planetary transmission to remain substantially constant even if the output rotation speed of the drive shaft of the electric machine changes. The shift clutch preferably has a third shift state in which the reference component is coupled neither to the static housing nor to the rotating component and the transmission of torque is interrupted. In this shift state, component loads can be avoided if the brake is open and a torque flow does not take place via the brake and the reference component in any case. The shift clutch may be designed in particular as a shift sleeve which is coupled rotationally conjointly to the reference component. In particular, the shift states of the shift clutch can be activated by means of an axially displaceable shift piston which axially displaces a shift sleeve for example via a driver. The shift piston is in particular part of a piston-cylinder unit, which is preferably hydraulically actuated. The shift clutch may predefine different rotational speeds for the sun gear in the first shift state and in the second shift state, such that, in addition to the gear ratio stage in the case of an open brake, two different gear ratios stages can be realized in the case of a closed brake. The motor vehicle transmission can thus be configured as a 3-ratio transmission.

It is preferable if an operation system for the hydraulic operation of the brake and of the clutch is provided, wherein, in particular, the brake and the clutch are chargeable with a hydraulic pressure from a common hydraulic reservoir. Owing to the brake and the clutch being positioned close together, it is possible for the brake and the clutch to share parts of the hydraulic operation system. The number of components and the structural space requirement can thus be reduced. The operation system is particularly preferably additionally provided for the hydraulic operation of the shift clutch, which can likewise be charged with a hydraulic pressure from the common hydraulic reservoir.

The invention furthermore relates to a drivetrain for an electrically driveable motor vehicle having an electric machine, having a motor vehicle transmission coupled to a drive shaft of the electric machine via a spur gear stage, which motor vehicle transmission may be embodied and refined as described above, and having an output shaft, which is connected, in particular via a differential transmission, to a planet carrier of the planetary transmission of the motor vehicle transmission and which serves for driving a drive wheel of the motor vehicle. By virtue of the brake and the clutch being arranged so as to overlap one another in a radial or axial direction, it is possible for axial and radial structural space, respectively, to be saved, such that a motor vehicle transmission with a small structural space requirement is made possible.

BRIEF DESCRIPTION OF THE DRAWING

Below, the invention will be explained by way of example with reference to the appended drawings on the basis of preferred exemplary embodiments, wherein the features presented below may in each case individually or in combination represent an aspect of the invention. In the drawings.

DETAILED DESCRIPTION OF THE INVENTION

Figure 1:
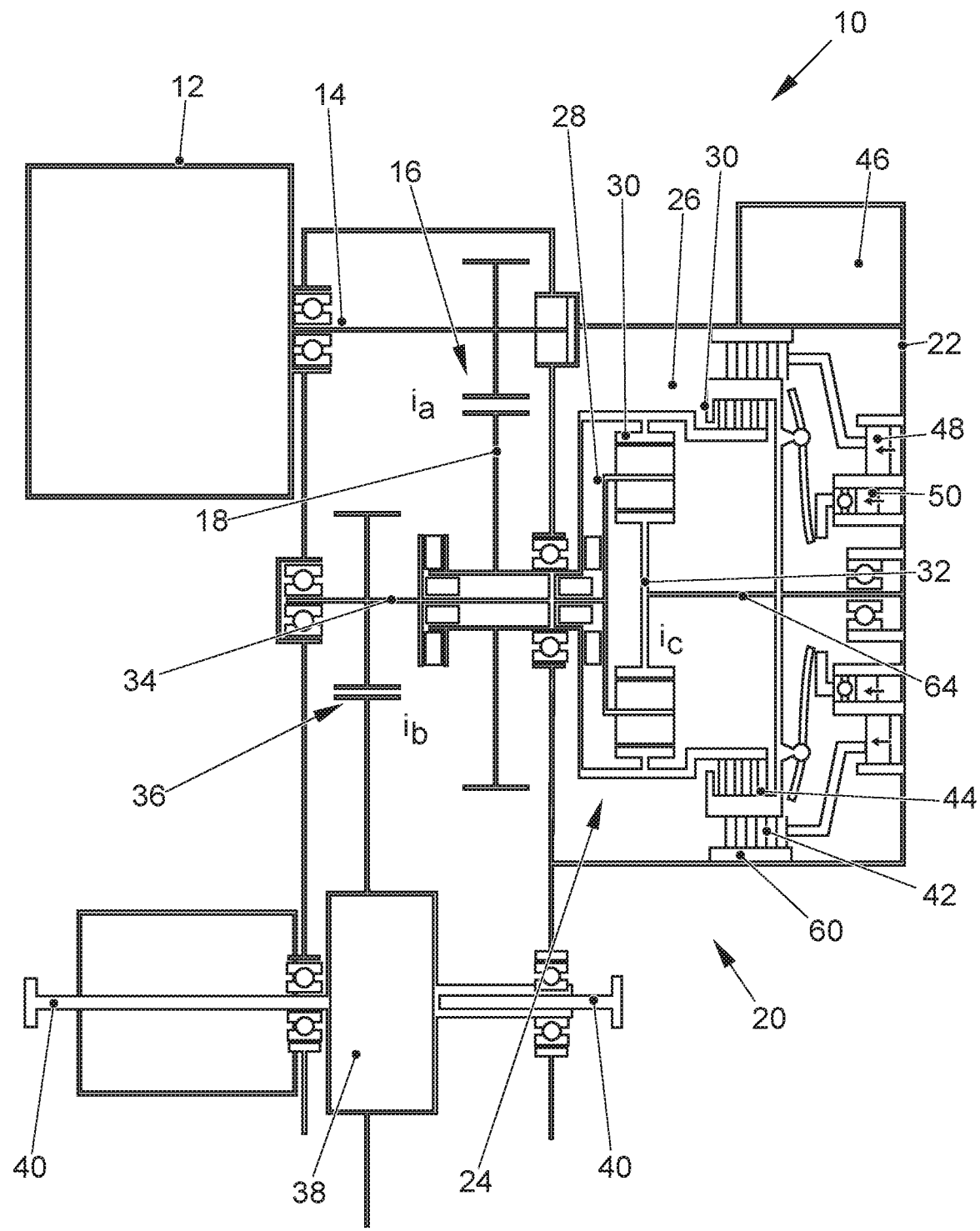
FIG. 1 is a schematic diagrammatic illustration of a drivetrain with a first embodiment of a motor vehicle transmission.

The drivetrain 10 provided in FIG. 1 for an electrically driven motor vehicle, in particular hybrid motor vehicle or electric vehicle, has an electric machine 12. A drive shaft 14 of the electric machine 12 is coupled via a spur gear stage 16 to an input toothed gear 18 of a motor vehicle transmission 20. The motor vehicle transmission 20 has a planetary transmission 24, which is arranged for example in an interior of a housing 22. The planetary transmission 24 has an internal gear 26, which is connected to the input toothed gear 18. The internal gear 26 is coupled to a sun gear 32 via planet gears 30 which are mounted on a planet carrier 28. The plant carrier 28 is connected to an output shaft 34 via which the power of the electric machine 12 converted by the planetary transmission 24 can be output. The output shaft 34 may be coupled via a toothed gear connection 36 to a differential transmission 38, in order, using the converted power, to drive drive wheels of the motor vehicle via output shafts 40 coupled to the differential transmission 38.

In order to be able to vary the transmission ratio of the planetary transmission 24 and be able to realize different transmission gear ratios, it is possible for the sun gear 32 to be immobilized on the static housing 22 by means of a brake 42, which is designed as a wet-running multiplate clutch. In the closed state of the brake 42, the sun gear 32 is at a standstill, with a rotational speed n=0 rpm. A clutch 44, which engages on the sun gear 32 and on the internal gear 26 and which is designed as a wet-running multiplate clutch, is in this case open. For another gear ratio of the planetary transmission 24, the brake 42 may be open and the clutch 44 may be closed, such that the sun gear 32 is coupled rotationally conjointly to the internal gear 26. The sun gear 32 and the internal gear 26 may in this case rotate at the same rotational speed. The motor vehicle transmission 20 is thus configured as a 2-ratio transmission. The brake 42 and the clutch 44 may be hydraulically operated by a hydraulic operation system 46. For this purpose, the hydraulic operation system 46 may pump a hydraulic fluid, in particular from a common hydraulic reservoir, into a brake operating actuator arrangement 48 assigned to the brake 42 and designed as an annular piston and/or into a clutch operating actuator arrangement 50 assigned to the clutch 44 and designed as an annular piston. A major part of the planetary transmission 24 and the brake 42 and the clutch 44 are arranged within the housing 22 and can thus be easily lubricated and/or cooled with oil.

In the exemplary embodiment illustrated in FIG. 1, the brake 42 and the clutch 44 are nested one inside the other, such that the brake 42 and the clutch 44 overlap one another, preferably entirely, as viewed in a radial direction. Axial structural space can thus be saved. The spur gear stage 16 is arranged axially offset with respect to the planet gears 30 of the planetary transmission 24. Alternatively, the spur gear stage 16 and the planet gears 30 of the planetary transmission 24 may be arranged in nested fashion one inside the other, such that the spur gear stage 16 and the planet gears 30 of the planetary transmission 24 overlap one another as viewed in a radial direction. Axial structural space can be saved in this way too.

Figure 2:
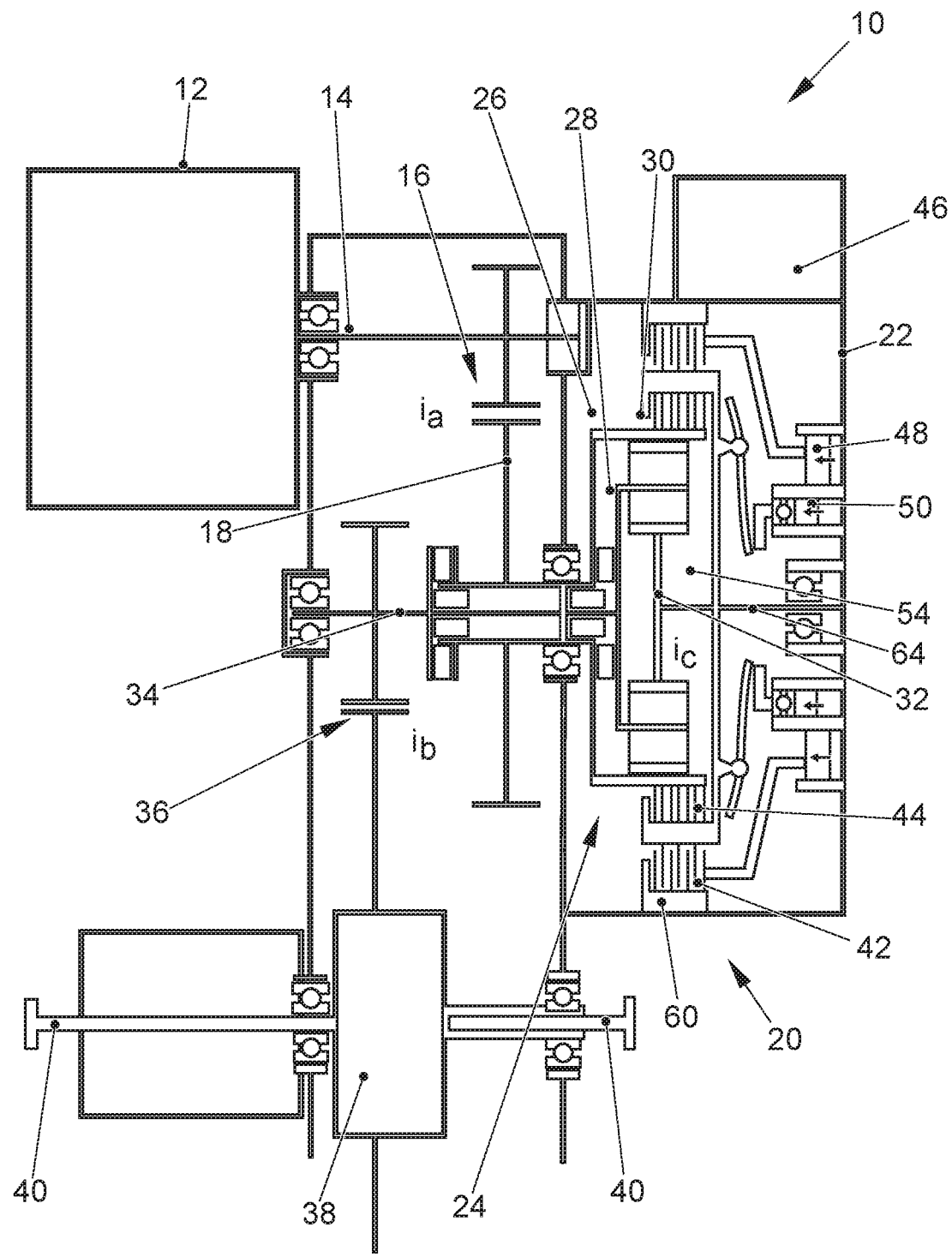
FIG. 2 is a schematic diagrammatic illustration of a drivetrain with a second embodiment of a motor vehicle transmission, FIG. is a schematic diagrammatic illustration of a drivetrain with a third embodiment of a motor vehicle transmission.

In the exemplary embodiment illustrated in FIG. 2, in relation to the exemplary embodiment illustrated in FIG. 1, it is also the case that the planet gears 30 of the planetary transmission 24 with the brake 42 and the clutch 44 are nested one inside the other, such that the planet gears 30, the brake 42 and the clutch 44 overlap one another, preferably entirely, as viewed in a radial direction. Axial structural space can thus be saved. The spur gear stage 16 is arranged axially offset with respect to the planet gears 30 of the planetary transmission 24.

Figure 3:
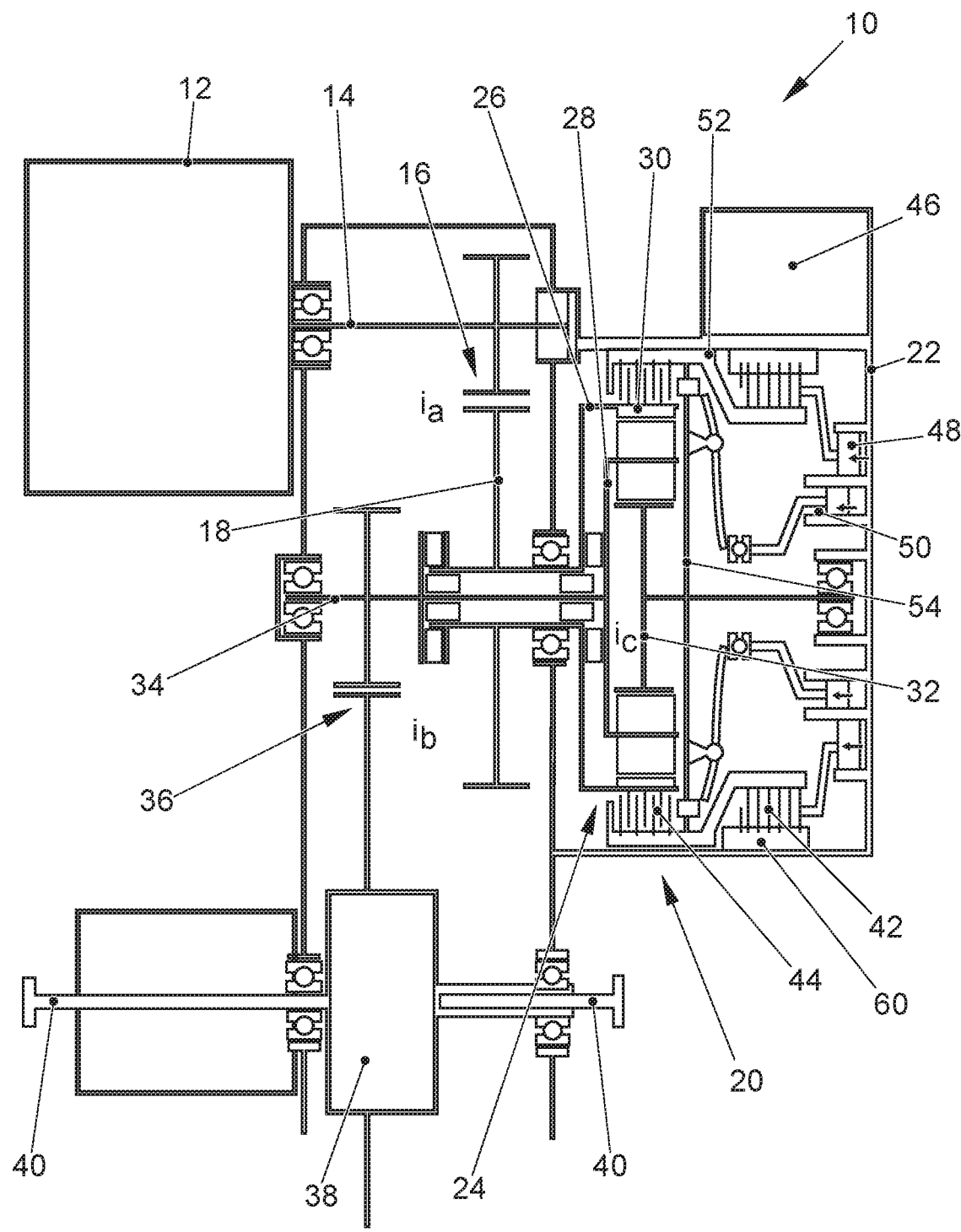

In the exemplary embodiment illustrated in FIG. 3, in relation to the exemplary embodiment illustrated in FIG. 2, the brake 42 and the clutch 44 are arranged one behind the other in an axial direction, such that the brake 42 and the clutch 44 overlap one another, preferably entirely, as viewed in an axial direction. Radial structural space can thus be saved. The brake 42 and the clutch 44 may both be arranged axially offset with respect to the planet gears 30 of the planetary transmission 24, wherein, in this case, it is possible in particular for the spur gear stage 16 and the planet gears 30 of the planetary transmission 24 to be arranged so as to be nested one inside the other, such that the spur gear stage 16 and the planet gears 30 of the planetary transmission 24 overlap one another, preferably entirely, as viewed in a radial direction. In the exemplary embodiment illustrated, the clutch 44 and the planet gears 30 of the planetary transmission 24 are arranged so as to be nested one inside the other, such that the clutch 44 and the planet gears 30 of the planetary transmission 24 overlap one another, preferably entirely, as viewed in a radial direction. Alternatively, the brake 42 and the planet gears 30 of the planetary transmission 24 may be arranged in nested fashion one inside the other, such that the brake 42 and the planet gears 30 of the planetary transmission 24 overlap one another, preferably entirely, as viewed in a radial direction.

Figure 4:
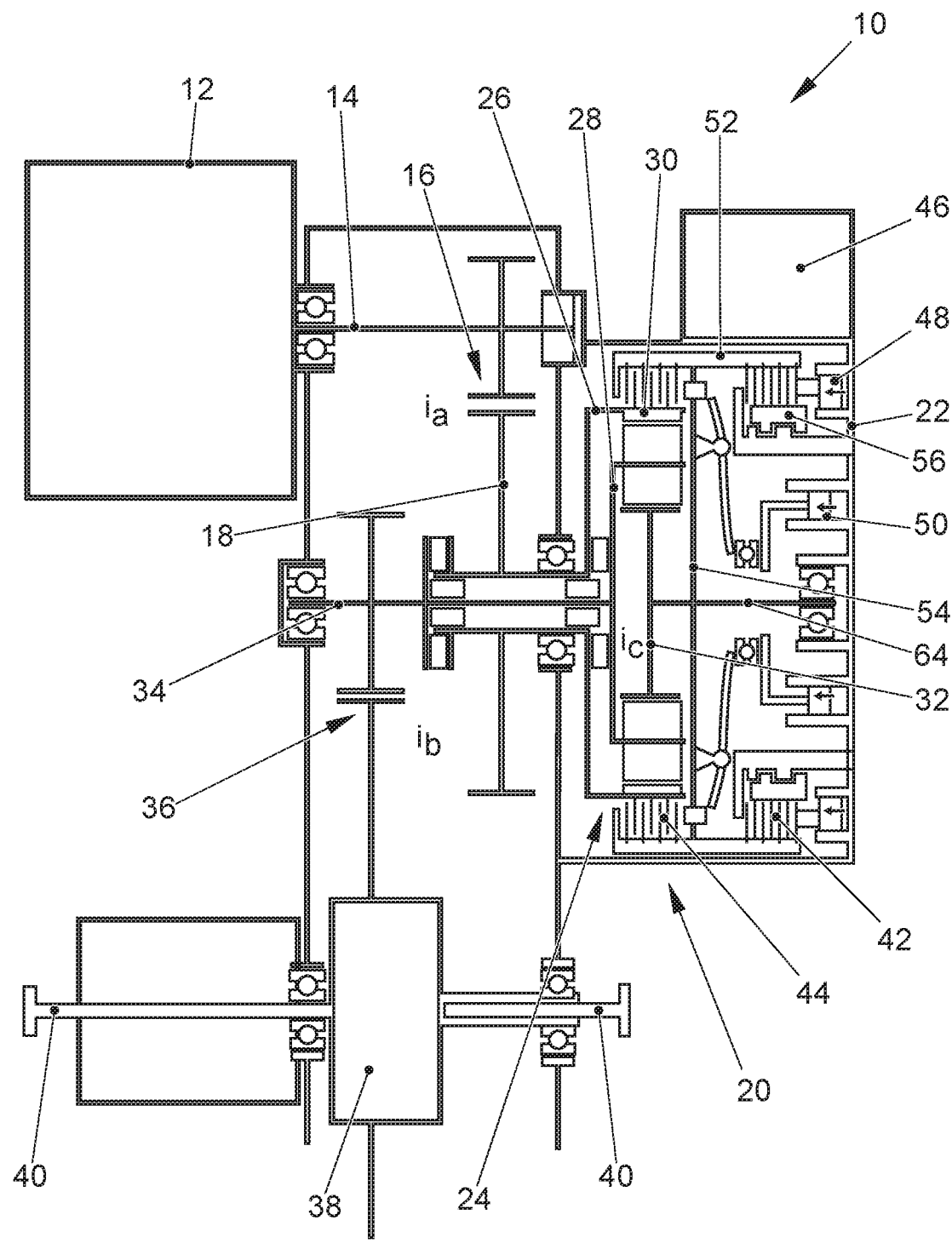
FIG. 4 is a schematic diagrammatic illustration of a drivetrain with a fourth embodiment of a motor vehicle transmission.

In the exemplary embodiment illustrated in FIG. 4, in relation to the exemplary embodiment illustrated in FIG. 3, the outer plate carriers of the brake 42 and the clutch 44 are formed by a carrier 52 arranged at a constant radius, which carrier is connected to the sun gear 32 via a radially running connecting web 54 which is led axially past the planet gears 30. It is also possible that the connecting web 54, a pressure plate for the brake 42 and/or for the clutch 44, or the clutch 44, can be pressed in the closed state.

Figure 5:
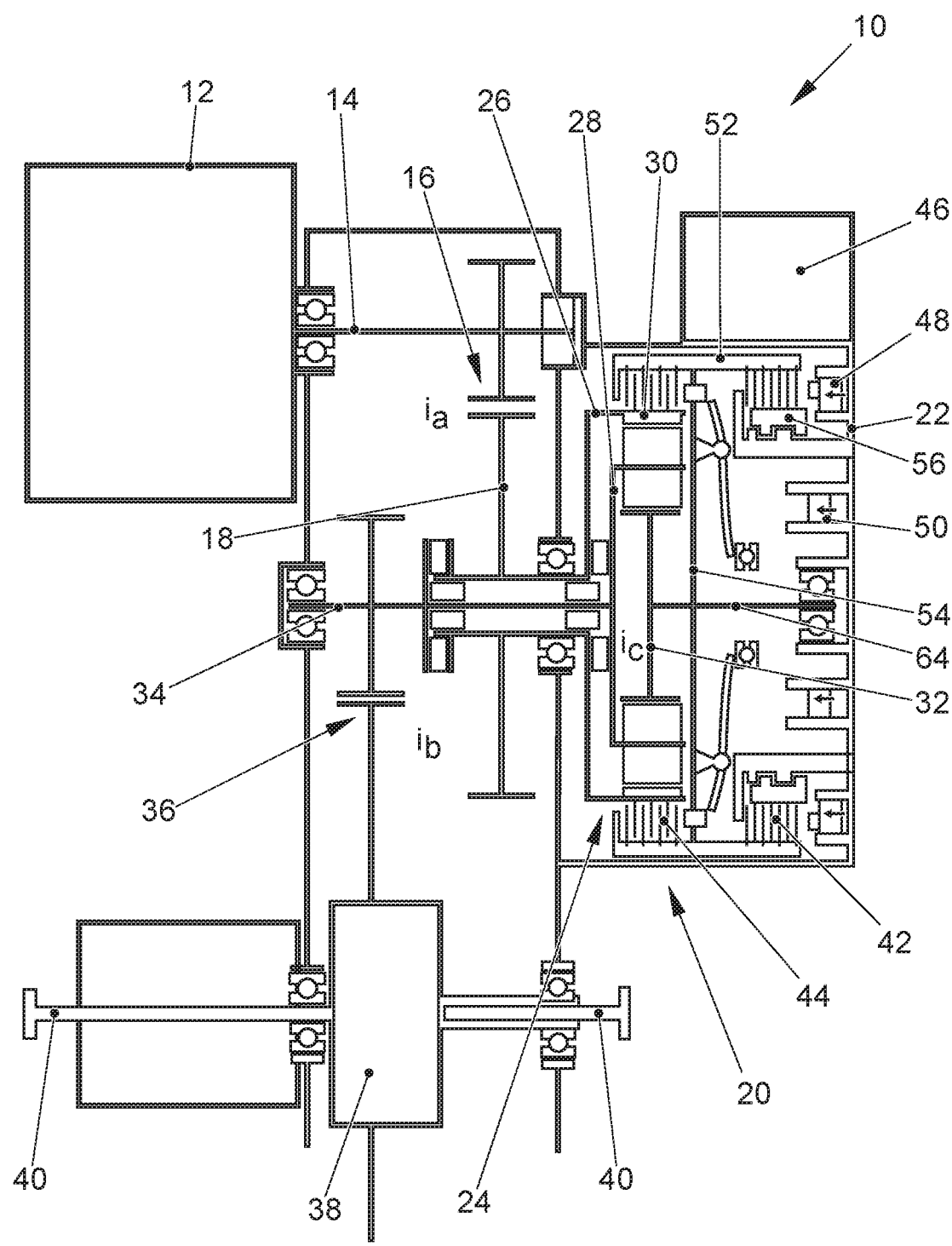
FIG. 5 is a schematic diagrammatic illustration of a drivetrain with a fifth embodiment of a motor vehicle transmission.

In the exemplary embodiment illustrated by way of example in FIG. 5, in relation to the exemplary embodiment illustrated in FIG. 4, an inner plate carrier 56 of the brake 42 is designed to be decouplable from the housing 22. In the closed state of the brake 42, the inner plate carrier 56 is connected rotationally fixedly to the housing 22, whereas the inner plate carrier 56, in the open state of the brake 42, is rotationally decoupled from the housing 22. In this way, the drag torque caused by the brake 42 in the open state, if in the open state of the brake 42 there is frictional contact between two plates which are adjacent in an axial direction, can be reduced. The inner plate carrier 56, which is decouplable from the housing 22, of the brake 42 may also be provided in the other embodiments described above.

Figure 6:
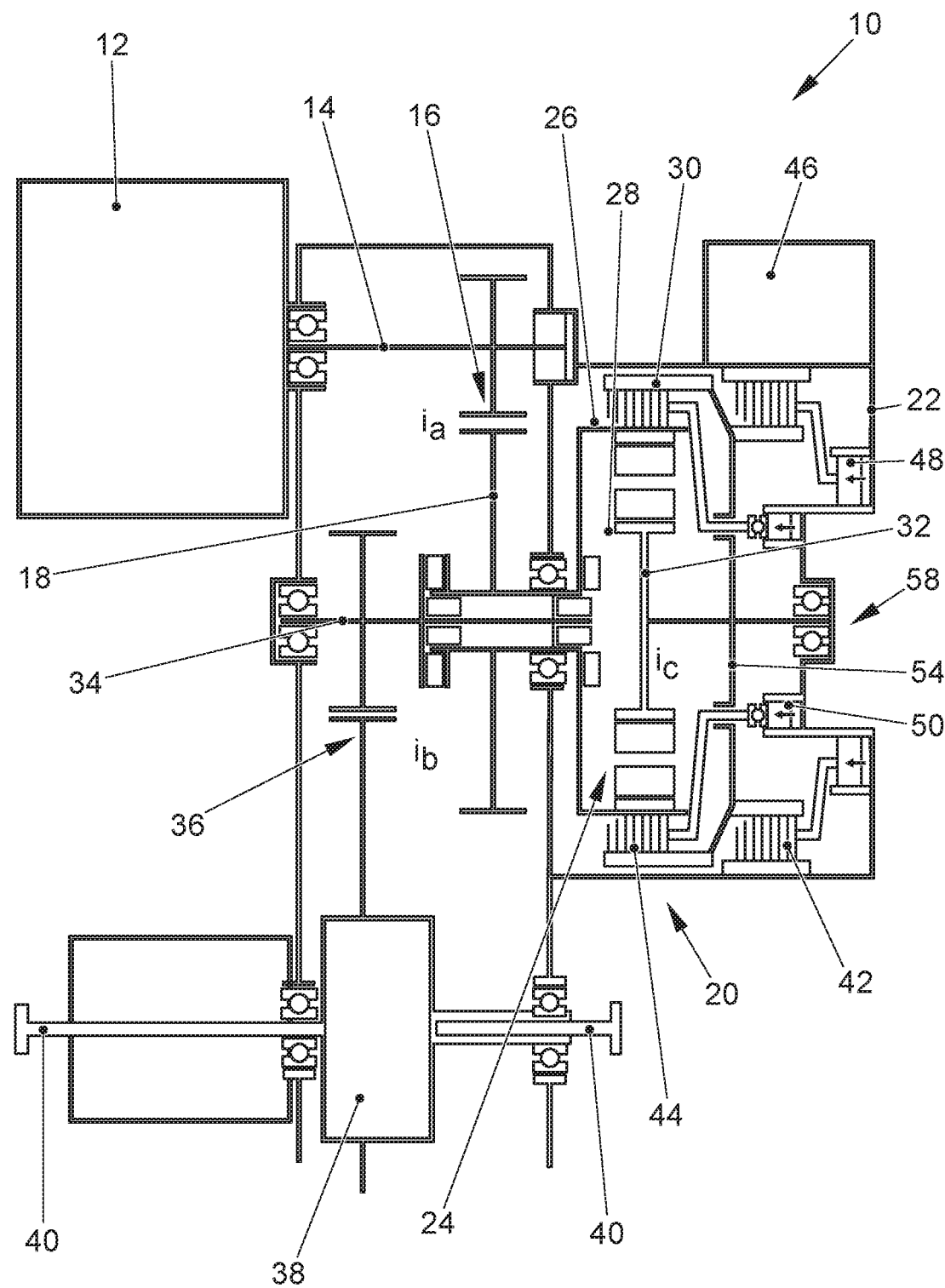
FIG. 6 is a schematic diagrammatic illustration of a drivetrain with a sixth embodiment of a motor vehicle transmission.

In the exemplary embodiment illustrated in FIG. 6, in relation to the exemplary embodiment illustrated in FIG. 3, the brake operating actuator arrangement 48 and the clutch operating actuator arrangement 50 are arranged offset with respect to one another in an axial direction. In this way, the clutch operating actuator arrangement 50 can be positioned in the interior of the housing 22 toward the planetary transmission 24 to such an extent that the clutch operating actuator arrangement 50 is arranged, in particular substantially entirely, radially within the brake 42, and is covered by the brake 42 as viewed in a radial direction. The housing 22 can thus form a depression 58 which creates structural space for another motor vehicle assembly.

Figure 7:
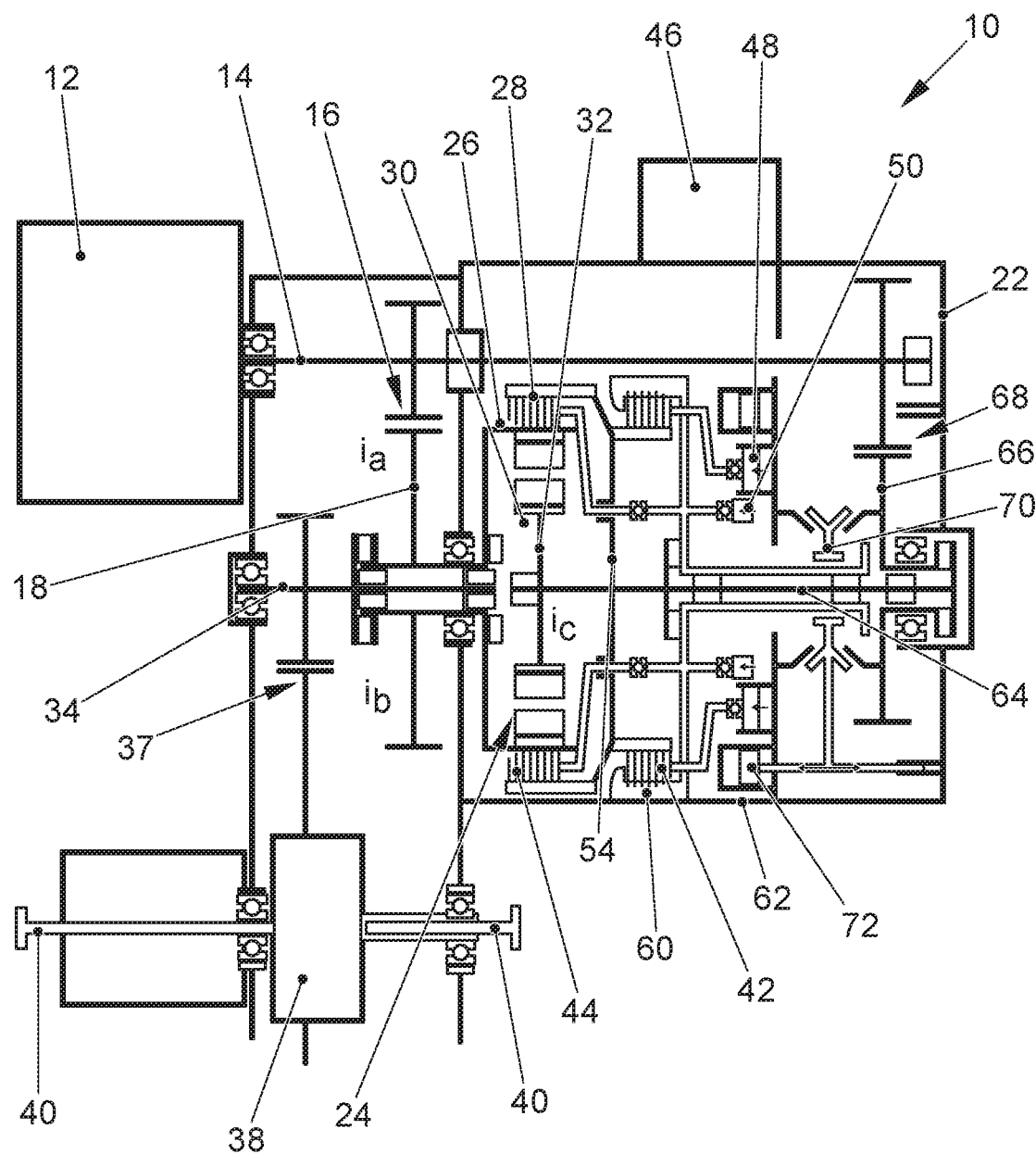
FIG. 7 is a schematic diagrammatic illustration of a drivetrain with a seventh embodiment of a motor vehicle transmission.

In the exemplary embodiment illustrated in FIG. 7, in relation to the exemplary embodiment illustrated in FIG. 3, an outer plate carrier 60 of the brake 42 is fastened not to the static housing 22 but to a rotatable reference component 62. The reference component 62 is designed as a hollow shaft, which is mounted radially and axially on a sun gear shaft 64 which is connected to the sun gear 32 of the planetary transmission 24. An axial relative movement of the reference component 62 is substantially prevented by means of the axial mountings. The reference component 62 may be coupled indirectly to the drive shaft 14 of the electric machine by means of a toothed gear 66 of a shift stage 68. In the exemplary embodiment illustrated, a shift clutch 70, designed for example as a shift sleeve, is connected between the rotatable reference component 62 and the toothed gear 66 of the shift stage 68. The shift clutch 70 can selectively couple the reference component 62 via the shift stage 68 to the drive shaft 14 or to the static housing 22. If the reference component 62 is coupled by means of the shift clutch 70 to the housing 22, the reference component 62 and thus also the outer plate carrier 60 are at a standstill, such that, in the closed state of the brake 42, the sun gear 32 is also at a standstill. If the reference component 62 is coupled indirectly to the drive shaft 14 by means of the shift clutch 70, the reference component 62 rotates, correspondingly to the transmission ratio provided in the shift stage 68, at a rotational speed which is dependent on the rotational speed of the drive shaft 14, such that the outer plate carrier 60 of the brake 42 and the sun gear 32 of the planetary transmission 24 also rotate at this rotational speed. By means of the shift clutch 70, two different gear ratio stages can be realized in the closed state of the brake 42. For this purpose, the shift clutch 70 can be axially displaced between two axial end positions by means of a shift piston 72, which is hydraulically operable by the operation system 46. The shift piston 72 may possibly activate an axial central position in the shift clutch 70, in which the reference component 62 is coupled neither to the housing 22 nor to the drive shaft 14 and a torque flow is interrupted.

What is claimed is:

1. A motor vehicle transmission for coupling an electric machine (12) to a drivetrain (10) of an electrically driveable motor vehicle, the motor vehicle transmission comprising:
    a planetary transmission (24) configured for converting a torque introduced by the electric machine (12), wherein an internal gear (26) of the planetary transmission (24) has an input toothed gear (18) for forming a spur gear stage (16) with a drive shaft (14) of the electric machine (12),
    a brake (42) for immobilizing a sun gear (32) of the planetary transmission (24) with a static housing (22), and
    a clutch (44) for rotationally conjointly connecting the sun gear (32) to the internal gear (26),
    wherein the brake (42) and the clutch (44) at least partially overlap as viewed in a radial direction.

2. The motor vehicle transmission as claimed in claim 1, wherein the brake (42) is arranged radially outside the clutch (44).

3. The motor vehicle transmission as claimed in claim 1, wherein planet gears (30) of the planetary transmission (24) which mesh with the internal gear (26) and with the sun gear (32) are at least partially overlapped by the brake (42) and by the clutch (44) as viewed in a radial direction, wherein, the planet gears (30) are arranged radially inside with respect to the brake (42) and to the clutch (44).

4. A motor vehicle transmission for coupling an electric machine (12) to a drivetrain (10) of an electrically driveable motor vehicle, said motor vehicle transmission comprising:
    a planetary transmission (24) configured for converting a torque that is introduced by the electric machine (12), wherein an internal gear (26) of the planetary transmission (24) has an input toothed gear (18) for forming a spur gear stage (16) with a drive shaft (14) of the electric machine (12),
    a brake (42) for immobilizing a sun gear (32) of the planetary transmission (24) with a static housing (22), and
    a clutch (44) for rotationally conjointly connecting the sun gear (32) to the internal gear (26),
    wherein the brake (42) and the clutch (44) at least partially overlap as viewed in an axial direction.

5. The motor vehicle transmission as claimed in claim 4, wherein planet gears (30) of the planetary transmission (24) which mesh with the internal gear (26) and with the sun gear (32) are at least partially overlapped by the brake (42) or by the clutch (44) as viewed in a radial direction, wherein, the planet gears (30) are arranged radially inside with respect to the brake (42) and the clutch (44).

6. The motor vehicle transmission as claimed in claim 4, wherein the sun gear (32) has a plate carrier (52) of a multiplate clutch which runs in the axial direction at a substantially constant radius, wherein the brake (42) and the clutch (44) engage on the carrier (52) at different subregions of the carrier (52) which are spaced apart from one another in the axial direction, wherein the carrier (52) projects in different axial directions from a substantially radially running connecting web (54) of the sun gear (32).

7. The motor vehicle transmission as claimed in claim 4, wherein planet gears (30) of the planetary transmission (24) which mesh with the internal gear (26) and with the sun gear (32) are at least partially overlapped by the input toothed gear (18) as viewed in a radial direction, wherein the planet gears (30) are arranged radially inside with respect to the input toothed gear (18).

8. The motor vehicle transmission as claimed in claim 4, wherein a clutch operating actuator arrangement (50), which is configured as a piston-cylinder unit and which serves for operating the clutch (44), and a brake operating actuator arrangement (48), which is configured as a piston-cylinder unit and which serves for operating the brake (42), are arranged offset with respect to one another in the axial direction, wherein, the clutch operating actuator arrangement (50) and the brake (42) at least partially overlap as viewed in a radial direction.

9. The motor vehicle transmission as claimed in claim 4, wherein a shaft (62) is connected by a shift clutch (70) for the coupling of the shaft (62) to either (i) the static housing (22) or (ii) indirectly via an interposed shift stage (68), to the drive shaft (14) of the electric machine (12).

10. The motor vehicle transmission as claimed in claim 4, further comprising an operation system (46) for the hydraulic operation of the brake (42) and the clutch (44), wherein the brake (42) and the clutch (44) are chargeable with a hydraulic pressure from a common hydraulic reservoir.

* * * * *